(12) United States Patent
Morton

(10) Patent No.: US 7,343,160 B2
(45) Date of Patent: Mar. 11, 2008

(54) SYSTEM AND METHOD FOR SERVICING COMMUNICATIONS USING BOTH FIXED AND MOBILE WIRELESS NETWORKS

(75) Inventor: Paul Morton, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 672 days.

(21) Appl. No.: 10/673,876

(22) Filed: Sep. 29, 2003

(65) Prior Publication Data

US 2005/0070326 A1    Mar. 31, 2005

(51) Int. Cl.
*H04Q 7/20* (2006.01)
(52) U.S. Cl. .............. 455/444; 455/436; 455/437; 455/439; 455/440; 455/41.2
(58) Field of Classification Search .............. 455/41.2, 455/436–440, 442–444, 41, 552, 553.1, 11; 370/338, 328
See application file for complete search history.

(56) References Cited

U.S. PATENT DOCUMENTS 6,876,642 B1* 4/2005 Adams et al. .............. 370/338

| | | | |
|---|---|---|---|
| 2003/0143987 A1* | 7/2003 | Davis et al. ................. | 455/417 |
| 2004/0090937 A1* | 5/2004 | Chaskar et al. ............. | 370/331 |
| 2005/0288021 A1* | 12/2005 | Hunkeler ..................... | 455/436 |
| 2006/0153133 A1* | 7/2006 | Zhong ......................... | 370/331 |

* cited by examiner

*Primary Examiner*—Nay Maung
*Assistant Examiner*—Fayyaz Alam
(74) *Attorney, Agent, or Firm*—Garlick Harrison & Markison; Robert A. McLauchlan

(57) ABSTRACT

Mobile wireless device(s) roam within and between premises and a vehicle or other mobile platform and interface to wireless local area networks within the premises or vehicle. When using the intra-vehicular network, a communication relay within the vehicle routes communications from the wireless device to a wide area wireless network such as cellular network or satellite network. This allows the power consumption of the mobile wireless device to be greatly reduced as the mobile device need only communicate with the local intra-vehicular WLAN. The vehicle acts as the power supply for the relay. When the coverage area of the intra-vehicular WLAN overlaps that of another WLAN, seamless handoff allows continuous data or voice connectivity between the overlapping wireless networks.

32 Claims, 15 Drawing Sheets

SYSTEM AND METHOD FOR SERVICING COMMUNICATIONS USING BOTH FIXED AND MOBILE WIRELESS NETWORKS

TECHNICAL FIELD

The present invention relates generally to mobile wireless devices, and more particularly to a mobile network relay device that allows wireless communication devices adapted to a first local wireless network to interface with a second wireless network.

BACKGROUND OF THE INVENTION

Communication technologies that network electronic devices are well known. Examples of those technologies include: wired packet data networks; wireless packet data networks; wired telephone networks; and satellite communication networks, among others. These communication networks typically include a network infrastructure that services a plurality of client devices. The Public Switched Telephone Network (PSTN) is probably the best-known communication network and has been in existence for many years. The Internet, another well-known example of a communication network, has also been in existence for a number of years. Communication networks like these enable client devices to communicate with one another on a global basis.

Local Area Networks (wired LANs), e.g., Ethernets, support communications between networked computers and other devices within a serviced area. These wired LANs often link serviced devices to Wide Area Networks (WANs) such as the Internet. Each of these networks is generally considered a "wired" network, even though some of these networks, e.g., the PSTN, may include some transmission paths that are serviced by wireless links.

More recently, wireless networks have come into existence. Examples include cellular telephone networks, wireless LANs (WLANs), and satellite communication networks. Common forms of WLANs include Bluetooth® and IEEE 802.11(a) networks, IEEE 802.11(b) networks, and IEEE 802.11(g) networks some of these networks are referred to jointly as "IEEE 802.11 networks." In a typical IEEE 802.11 network, a wired backbone couples to a plurality of Wireless Access Points (APs), each of which supports wireless communications with computers and other wireless terminals that include compatible wireless interfaces within a serviced area. The wired backbone couples the APs of the IEEE 802.11 network to other networks, both wired and wireless, and allows serviced wireless terminals to communicate with devices external to the IEEE 802.11 network. Devices that operate consistently with an IEEE 802.11 protocol may also support ad-hoc networking in which wireless terminals communicates directly to one another without the presence of an AP.

Bluetooth® enabled wireless devices allow mobile devices having both low cost and low power consumption. However, these devices cannot use the Bluetooth® protocol to access network resources in a mobile environment that extends beyond the short range of their digital radio systems. Thus, most mobile systems rely on wider range cell networks that consume far more power than Bluetooth® systems. This higher level of power consumption reduces the usefulness of these devices by negatively impacting the battery life of the device.

WLANs can support both voice and data communications via wireless terminals. When supporting voice communications, these wireless terminals often interface with the PSTN through the WLAN. The communications are routed between the PSTN or other WAN and a serviced wireless terminal via a WLAN interfaced to a PBX other like device. Those wireless voice terminals may roam anywhere within the service area of the WLAN and receive voice service. However, should the wireless terminal roam outside of the service area of the WLAN, the call will be dropped. Thus, a need exists for those wireless terminals to roam and be handed off to and serviced outside of the coverage area of the WLAN.

SUMMARY OF INVENTION

This disclosure teaches mobile device(s) that may be located within a vehicle or other mobile platform. The mobile devices interface to a mobile wireless network within the vehicle. A relay routes communications from the mobile device to a wide area wireless network such as cellular network or satellite network. This allows the power consumption of the mobile device to be greatly reduced as the mobile device need only communicate with the local intra-vehicular WLAN. The vehicle services as the power supply for the relay.

When the coverage area of the intra-vehicular WLAN overlaps that of another WLAN, a seamless handoff allows continuous data or voice connectivity between the overlapping wireless networks. Thus, a Bluetooth® equipped voice handset phone can safely range between a premises-based network(s) and mobile vehicle network(s) without negatively impacting data connectivity.

This disclosure more specifically teaches that Bluetooth® enabled wireless devices may roam between WLANs that support Bluetooth® voice and/or data communications by establishing parallel communication pathways between the Bluetooth® enabled wireless terminal and overlapping Bluetooth® enabled WLANs. In one example, a first WLAN is fixed to a physical location while a second WLAN has mobile APs. The second WLAN communicatively couples to a WAN such as a cellular satellite network. Parallel communications are established, and handoff criteria govern seamlessly switching communications between the WLANs in order to avoid any lost or dropped communications.

Another embodiment provides the mobile network relay device itself. This mobile network relay device has a first wireless interface operable to communicate with the wireless device over an intra-vehicular WLAN. A second wireless interface communicatively couples to an extravehicular wireless network. The mobile network relay device routes communications between the first wireless interface and the second wireless interface and thus between the wireless device and the extravehicular wireless WAN. This arrangement allows the power consumption requirements of the wireless device to be reduced as this burden shifts to the mobile network relay. The intra-vehicular WLAN is typically a low-power, short-range, digital radio network such as Bluetooth® or another like network. The extravehicular network(s) typically are cellular, satellite, or other like network(s) known to those skilled in the art.

Additionally, parallel pathways allow wireless device(s) to roam between dynamically overlapping coverage areas of the intra-vehicular wireless network and premises based WLANs.

Processors, within either the vehicular mountable relay or wireless device itself, govern which network services the communications and the handoff of the wireless device between premises based WLANs and intra-vehicular WLANs serviced by extravehicular WANs. During handoff, parallel communication paths service the wireless device. These parallel communication paths include: (1) the wireless device to the premises based wireless network; and (2) the wireless device to the extra-vehicular wireless network via the first intra-vehicular wireless interface, the vehicular mountable relay, and the second extravehicular wireless interface.

As previously stated, the wireless device(s) may handle voice, data, or video communications. Thus, the wireless device may take the form of a telephone handset, camera, mobile computing device, personal data assistant, laptop computer, or other like device known to those skilled in the art.

Additionally, the wireless device may have the internal ability to communicate over Bluetooth®, 802.11, cellular, satellite or other like networks. Here, internal processors choose which network is to be used to balance the signal quality, transmission cost, and power consumption. Furthermore, these internal or external abilities, when coupled to a mobile relay, allow the mobile device to range between a first premises based WLAN and a second premises based WLAN that have non-contiguous service coverage areas.

To simplify the construction of the wireless device, the decision making process may be executed by processors within the mobile network relay device. In one example, a cellular connection though the wireless devices' cellular interface has a first quality of signal. A communication pathway through the extravehicular network wireless has a second quality of signal. The processor directs that communications of the wireless device be serviced by the cellular connection or extravehicular wireless network after comparing the first quality of signal and the second quality of signal. Alternatively, the handoffs may be initiated after comparing the signal strength of the premises based WLAN and the extravehicular WLAN.

To limit the number of wireless devices attempting to communicate through the mobile network relay device, the wireless device may be required to register with the module network relay device. Communications from unregistered wireless devices may be ignored. Mobile network relay device may be mounted within a vehicle, such as a plane, train, boat or automobile.

Another embodiment provides a method of servicing communications to mobile wireless device(s). First, a communication pathway between the mobile wireless device and a premises based wireless network is established. This communication pathway allows the mobile wireless device to communicate with resources available through the premises based wireless network. These communications may convey images, voice, or data communications. The mobile wireless device may be repositioned to an area wherein coverage of the premises based wireless network overlaps that of an intra-vehicular wireless network.

Parallel communication pathways to the wireless device allow communications to be routed between the mobile wireless device and the premises based wireless network, or the mobile wireless device and an extravehicular wireless network via a vehicular wireless interface, a vehicular mountable relay, and an extra-vehicular wireless interface. Handoffs of servicing the wireless device occur between the premises based wireless network(s) and the intra-vehicular wireless network based on predetermined criteria. Continuous communications are maintained between the mobile wireless device and the resources ensuring that no losses of data or dropped calls are experienced.

This decision making process may direct how the mobile wireless device be serviced after comparing the WLAN(s) and other connection to the mobile wireless device's quality of signal and the quality of signal of a communication pathway through the extravehicular wireless network. Other factors such as cost and network traffic may be factored into this decision making process.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGs, like numerals being used to refer to like and corresponding parts of the various drawings.

Figure 1A:
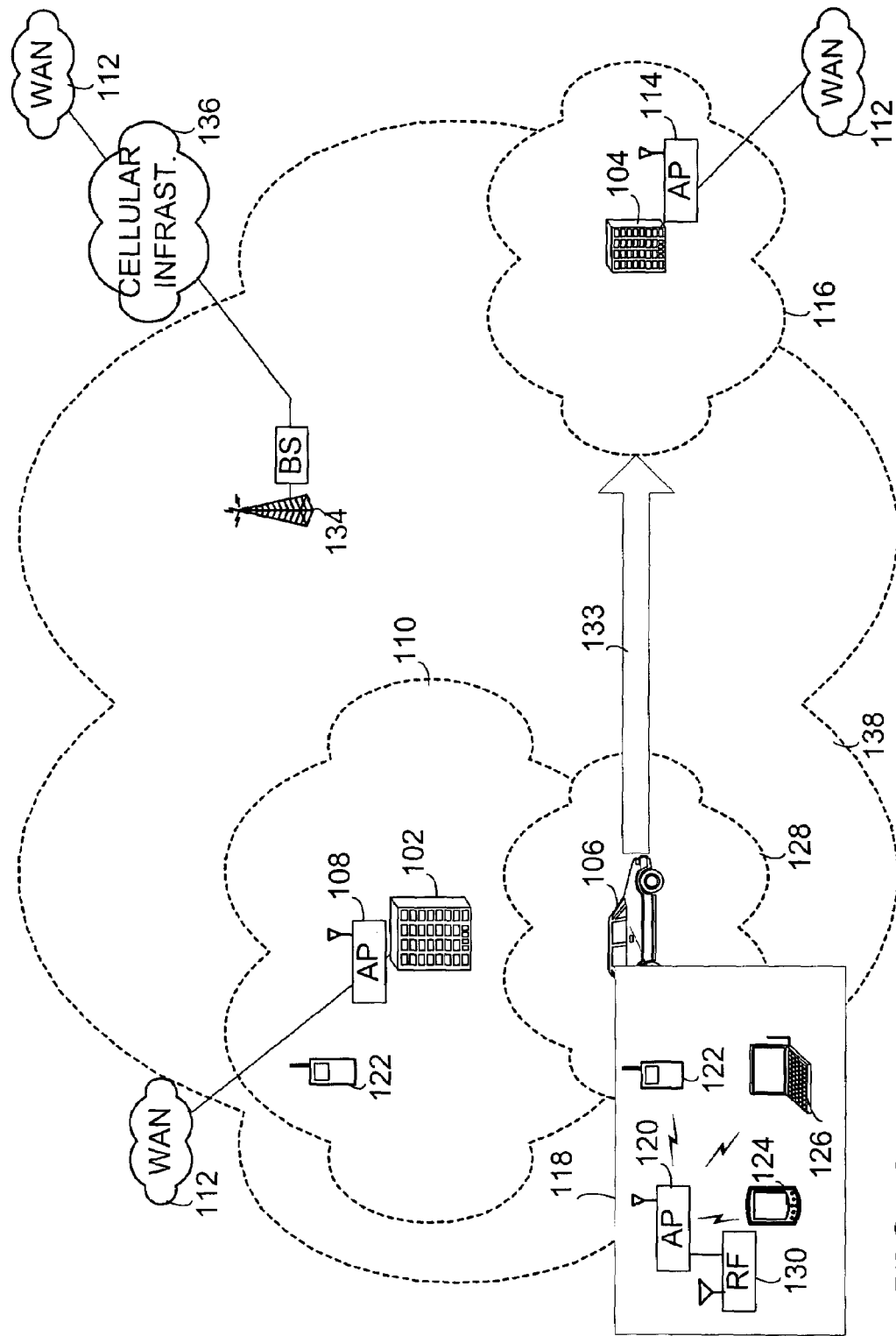
FIGS. 1A-1D provide is a system diagram illustrating a premises and mobile Wireless Local Area Network (WLAN) deployed to service wireless devices.

FIG. 1A provides a system overview in which WLANs serve fixed locations, such as those tied to building 102 and building 104, and mobile locations such as vehicle 106. Building 102 has at least one Wireless Access Point (AP) 108 which enables Personal Data Assistants (PDAs), telephone handsets, laptops, mobile computing devices and other wireless devices to interface with WLAN 110. This WLAN may connect to Wide Area Network (WAN) 112 such as the Internet or other like WANs known to those skilled in the art. Similarly, building 104 has AP 114 used to serve wireless devices within coverage area 116. As shown in callout 118, a wireless AP 120 within vehicle 106 may serve wireless handset 122, PDA 124, laptop 126 or other wireless devices as known to those skilled in the art. The coverage area of WLAN 128 serviced by AP 120, as shown in FIG. 1A, overlaps the coverage area of WLAN 110. Directional arrow 133 shows that vehicle 106 may travel between various WLANs.

Figure 1B:
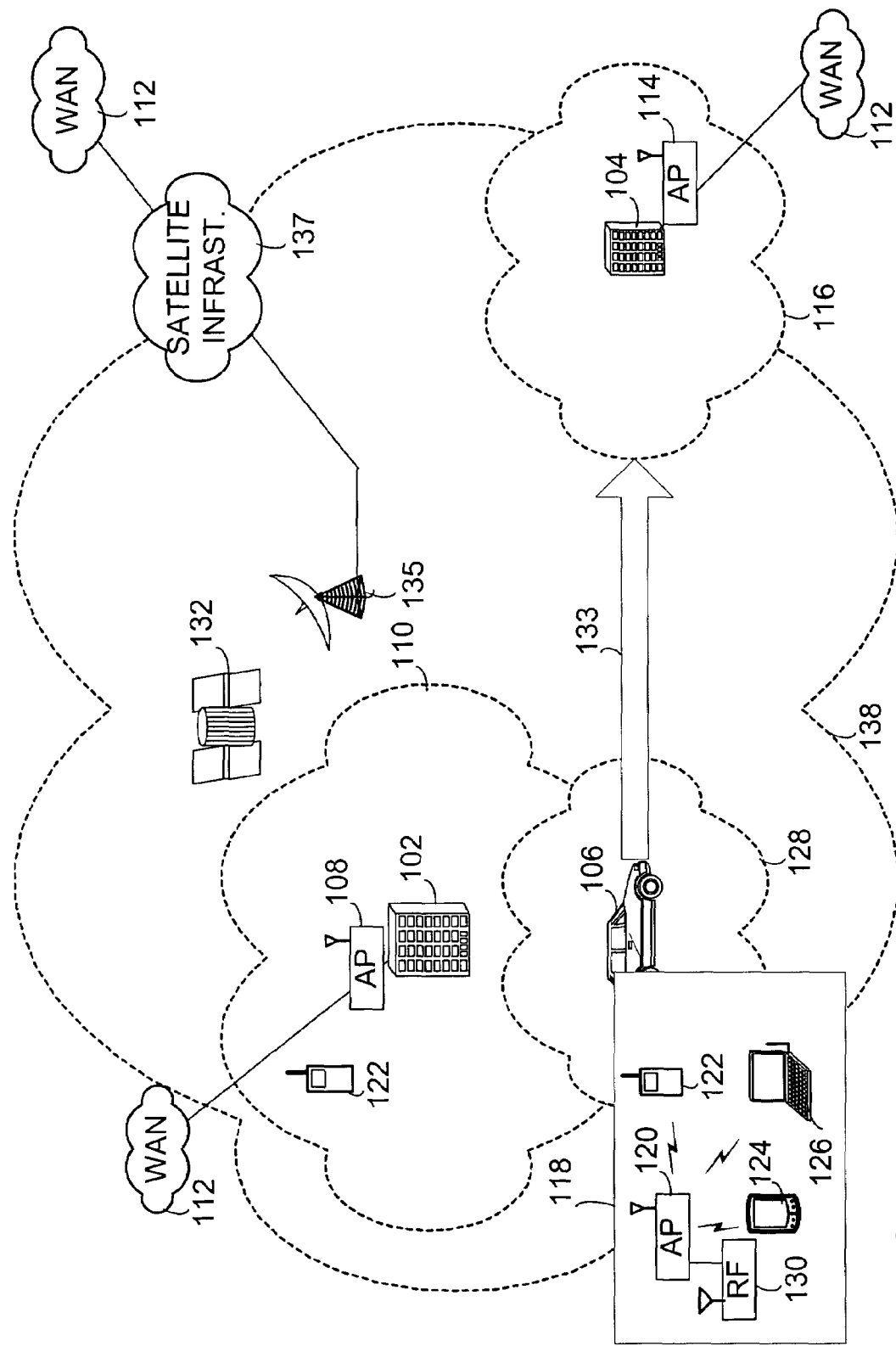

WLAN 110 may service wireless handset 122, initially located within WLAN 110, initially. A user carrying and communicating via wireless handset 122 may leave building 102 to travel to vehicle 106. As the user and wireless handset 122 leave building 102, they enter an overlapping coverage area of WLAN 128 tied to vehicle 106. When this occurs, the handset's communications will be serviced in parallel with and then handed off to WLAN 128, which is tied to vehicle 106, in favor of WLAN 110. To maintain a continuous connection with WAN 112, communications from handset 122 are routed in parallel through WLAN 110 and WLAN 128. In the case of WLAN 128, AP 120 within vehicle 106 routes the communications to RF Interface 130 for servicing through a Satellite communications system 132, Cellular Communications System 134, or other like network. When serviced by the cellular network, received communications travel between RF Interface 130 and Base Station 134. This communication is then routed through the Cellular Infrastructure 136 to its intended destination over WAN 112. WAN 112 may be the Internet, the PSTN, or other like network known to those skilled in the art. Similarly, when RF Interface 130 communicates with Satellite 132, receiving station 135 and satellite infrastructure 137 deliver communications via the satellite to WAN 112 as shown in FIG. 1B.

This disclosure teaches that wireless devices, such as handset 122, computing device 126 or PDA 124 may communicate with the WAN through mobile AP 120 and RF Interface 130. This allows the power consumption of the wireless device to be greatly reduced when communications are routed through AP 120 and RF Interface 130. Power consumption is reduced and battery life extended by allowing the wireless device to maximize its use of low power, short-range, digital radio. Communication with alternative networks, such as cellular network 134 or satellite network 132, requires more power and is executed by the vehicle. Thus, the cost and complexity of the wireless device may be reduced as only short-range communications with local APs must be established in order to maintain and serve continuous communications between the wireless device and their destination via the wide area network.

Figure 1C:
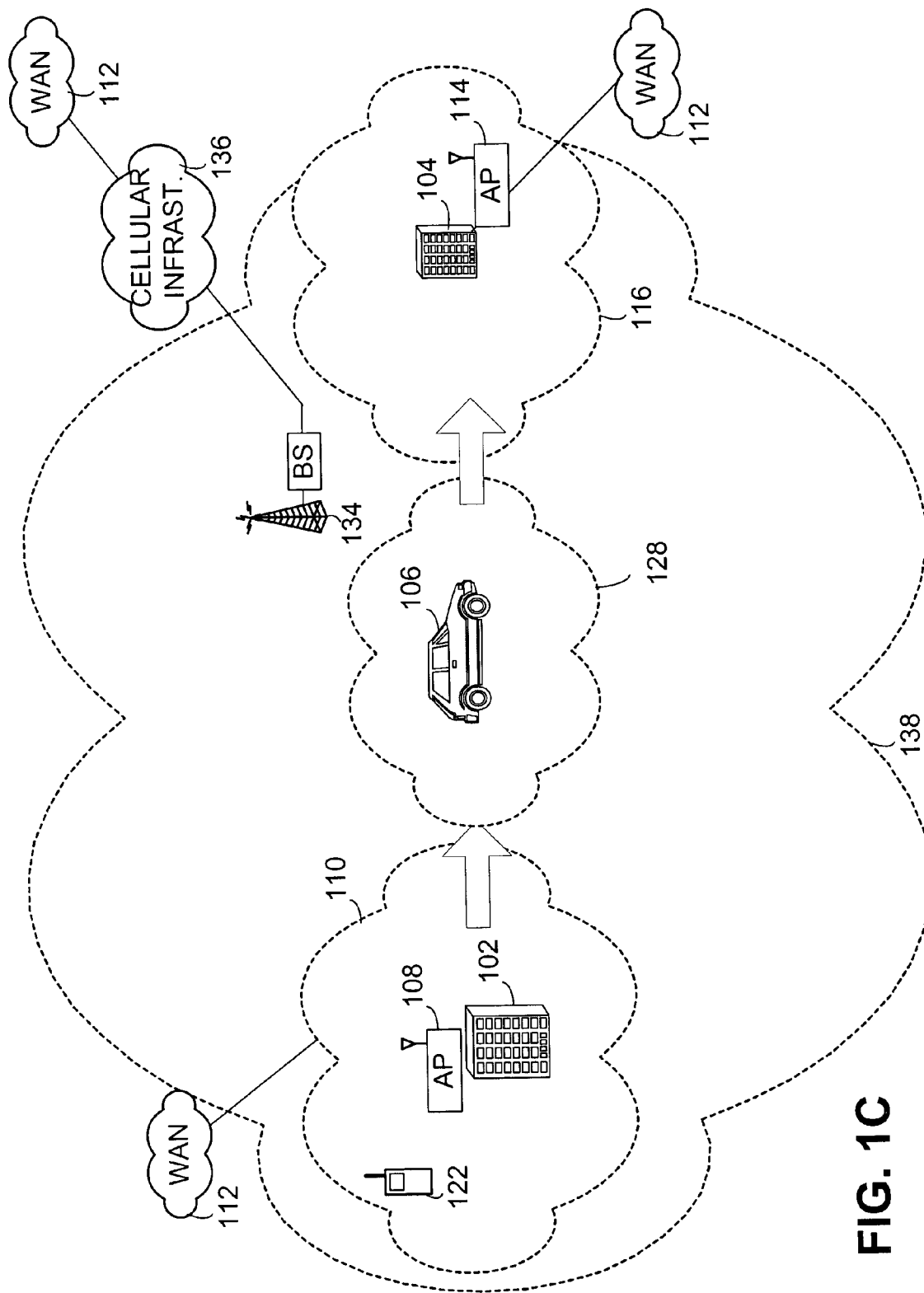
Figure 1D:
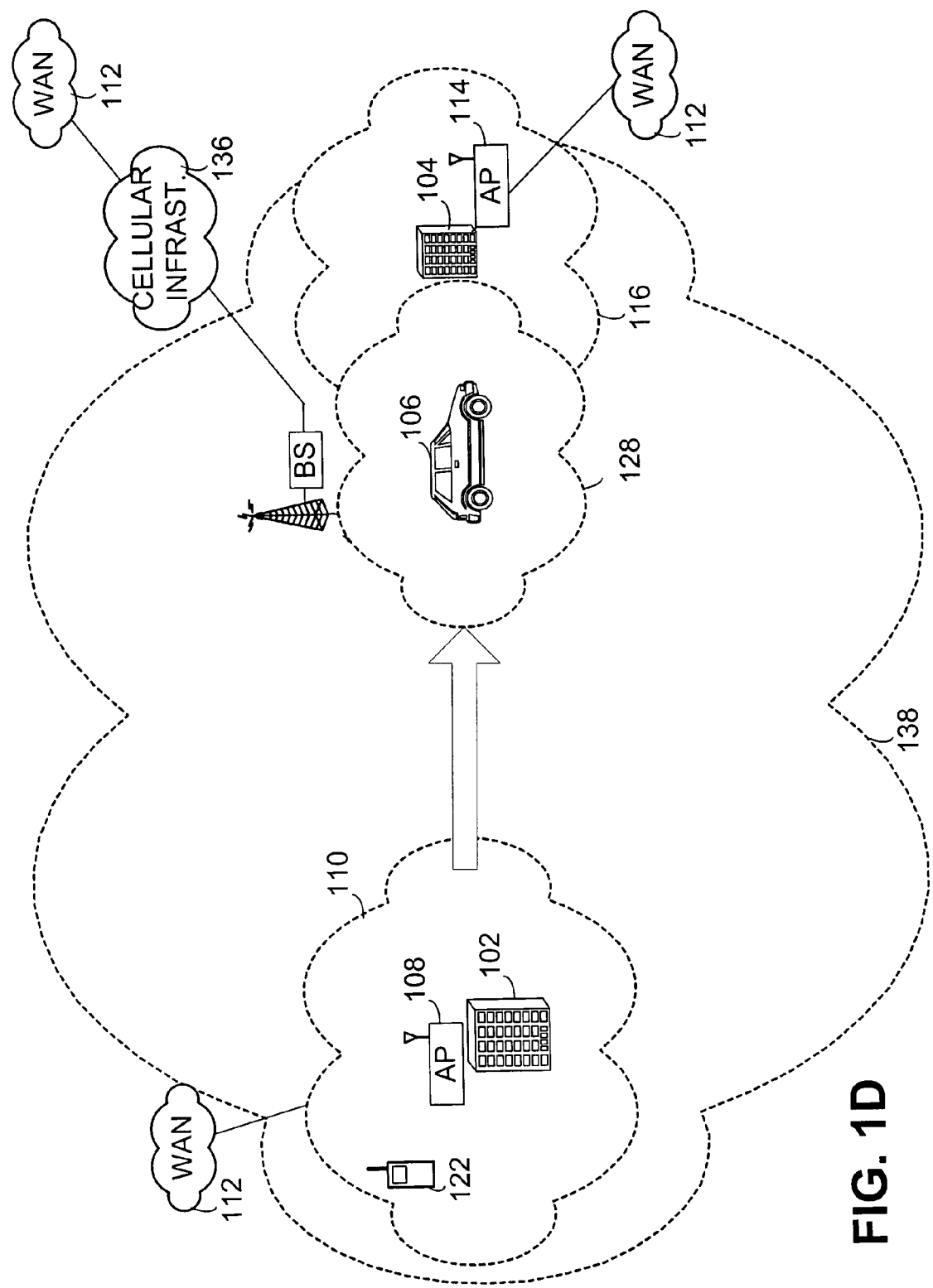

This arrangement allows continuous low power communications to be maintained with the wireless device as a user leaves building 102, and transits to vehicle 106. Vehicle 106 has an intra-vehicular WLAN 128 that travels with the vehicle as the vehicle transits between building 102 and building 104 as shown in FIG. 1C. Upon arrival at building 104, as depicted in FIG. 1D, WLAN 128 overlaps WLAN 116. This overlap allows the servicing of the communications for the wireless device to be handed off from the intra-vehicular network, WLAN 128s, to WLAN 116.

Figure 2:
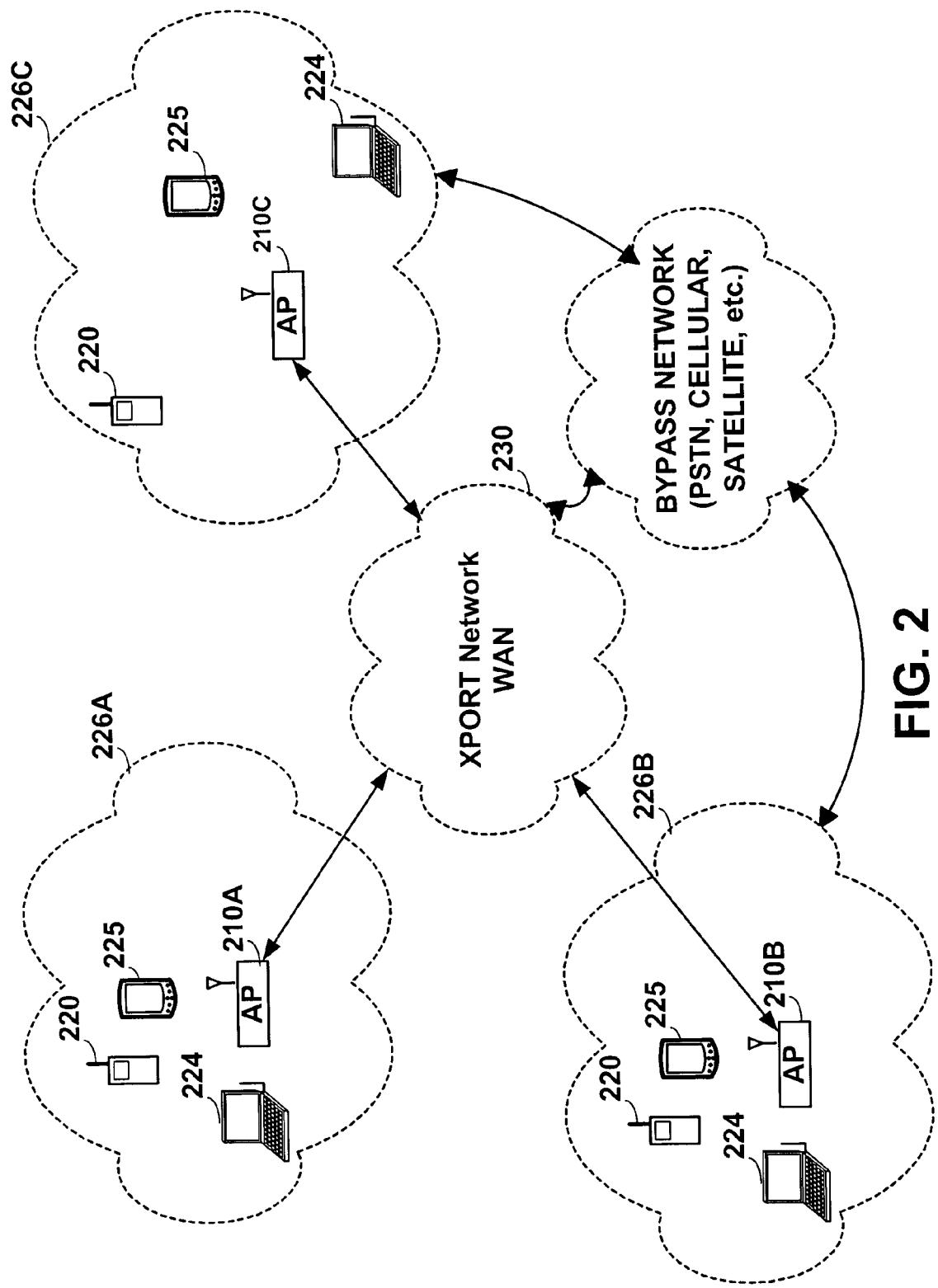
FIG. 2 illustrates a network connection servicing the wireless communications.

FIG. 2 depicts various WLANs interconnected by WAN 230 in which communications to wireless devices are serviced. Each building 102 and 104, as well as vehicle 106 has placed therein APs 210A, 210B and 210C that service corresponding WLANS 226A, 226B and 226C. Each of these APs 210A-210C may couple to WAN 230 via wired or wireless network infrastructure.

Serviced within the buildings 102 and 104 are wireless telephones/data terminals 220, PDA's 225 and laptop computers 224, which may be referred to jointly as "wireless devices" or stations (STAs). Each of these wireless devices communicates with a servicing AP. For example, laptop computer 224 and wireless terminal 212 wirelessly communicate with AP 210. Each of the APs 210 supports wireless communications primarily within a designated area. However, the coverage area of each AP 210 may extend beyond the boundaries of the serviced building or vehicle so that overlapping coverage areas exist. For example, in FIG. 1A, APs 108 and 120 simultaneously provide service between building 102 and vehicle 106. This allows wireless terminals that roam between the building and vehicle to continue to receive wireless communications. Some or all of the STAs may also support ad-hoc networking in which they communicate directly, without AP interaction.

Each WLAN has a given coverage area, which may or may not overlap with the coverage areas of other WLANs. Wireless terminals 220, 222 and 224 and 225 may roam between WLANs 226. A backbone or transport network 230 communicatively couples the WLANs 226. In this way, wireless terminals within the covered area of a WLAN 226A, can communicate to other wireless terminals within other networks. Alternatively, WLANs 226 may communicate with WAN 230 via an alternative network 232 as shown. This allows WLANs to become mobile in nature.

A processor may regulate the data flow and communications between WLANs 226 to ensure that communications requiring real time transmissions, such as voice communications or other multi-media applications take priority and potentially delay communications having lower priorities. Alternatively, the processor may direct that should the backbone of the WAN be unable to support the bandwidth requirements of the real time communications, those communications may be routed through an alternative network such as the PSTN, cellular network, a satellite communications network, or any other like network known to those skilled in the art.

Figure 3:
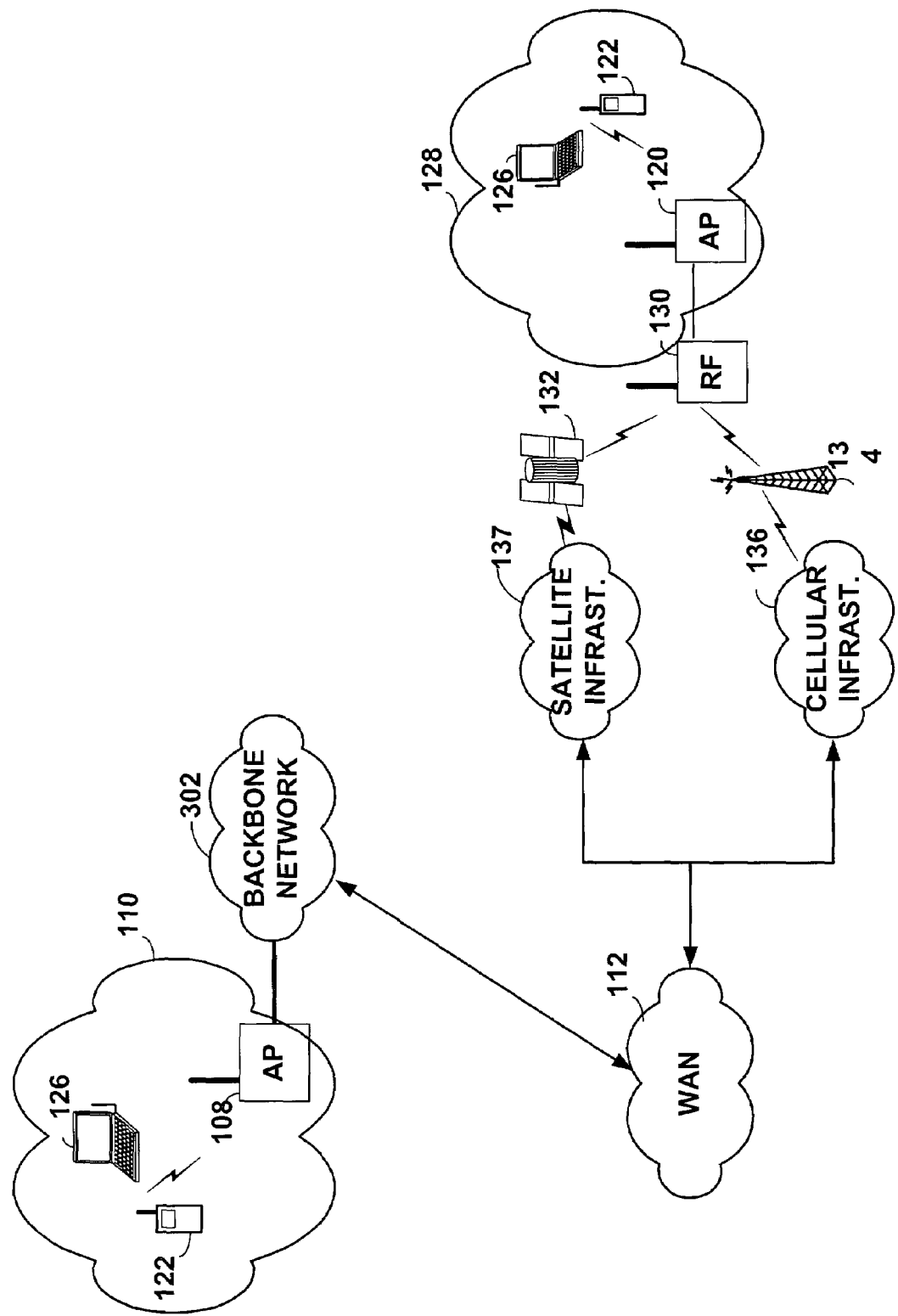
FIG. 3 is a partial system diagram of a WLAN and a cellular network.

FIG. 3 provides a partial system diagram wherein WLAN 110 services building 102. WLAN 110 supports at least one standardized operation having provisions for servicing voice communications, e.g., IEEE 802.11(a), IEEE 802.11(b), IEEE 802.11(g), etc. The portion of the WLAN shown includes AP 108 that supports wireless communications within a serviced area. AP 108 communicatively couple to WAN 112 to service wireless communications for wireless devices 122, 124 and 126. Service areas supported by APs 108 and 128 may partially overlap. To service voice calls, WAN 112 may couple to a Private Branch Exchange (PBX) 304. The PBX couples to the PSTN, another WAN or an alternative network. These alternative networks may also tie into WAN 112. These networks may include cellular infrastructure 136 or satellite infrastructure 137 or other like networks known by those skilled in the art.

A PBX may service voice communications for the premises, may employ packet switched or circuit switched operations, may support digital or analog operations, include advanced features such as voice messaging, and support incoming call servicing, outgoing call servicing, and wireless terminal roaming. A PBX, in conjunction with WAN 112 and APs 108 and 120, may facilitate roaming operations between WLAN 110 and 128 and other alternative networks. Roaming operations may begin prior to a wireless terminal leaving the coverage area of one WLAN to enter the coverage area of another WLAN, and during an ongoing call.

Figure 4A:
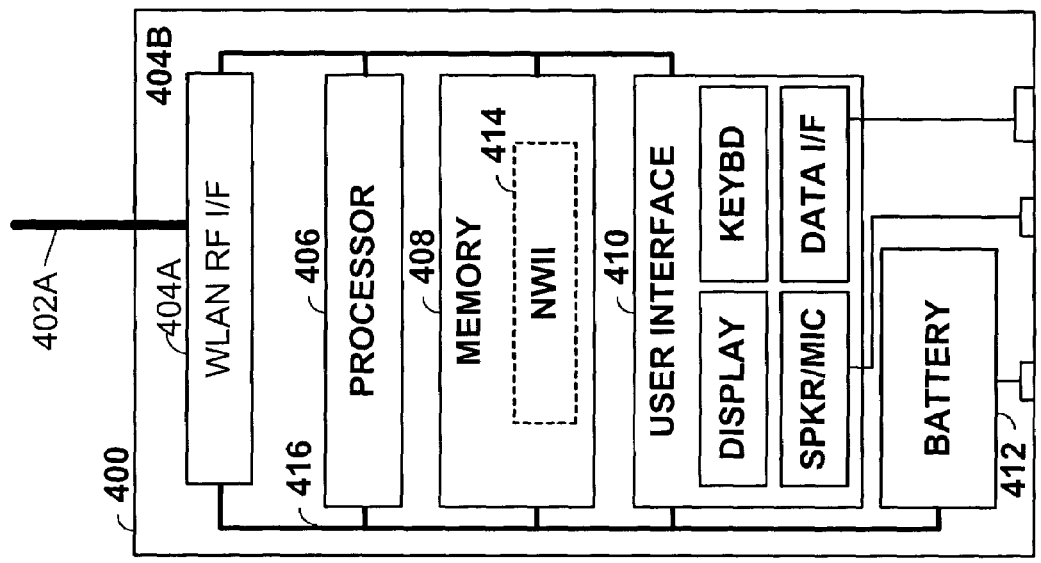
FIG. 4A-4F provide diagrams illustrating the embodiments of wireless devices.
Figure 4B:
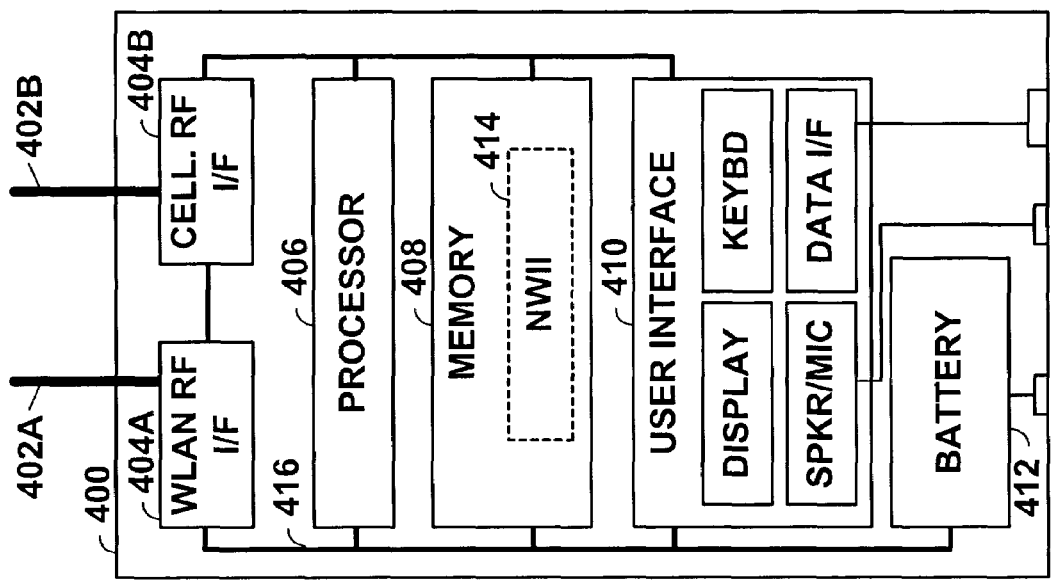
Figure 4C:
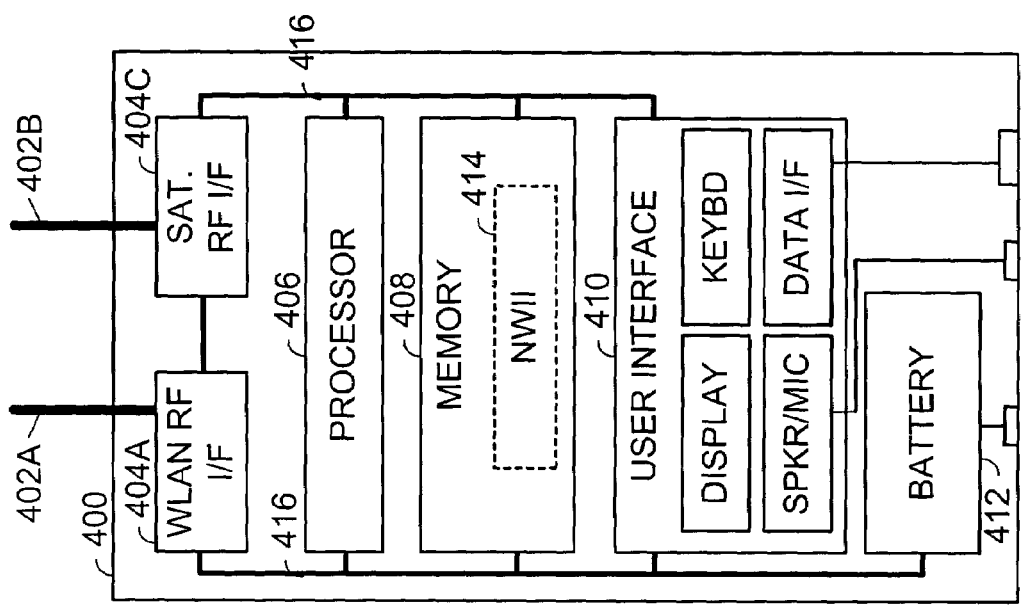
Figure 4D:
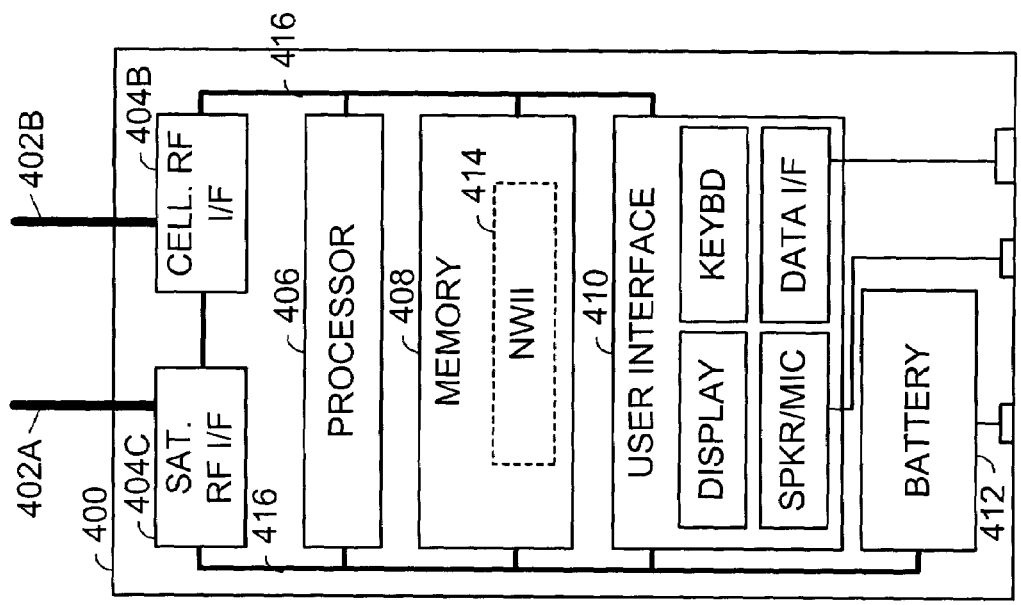
Figure 4E:
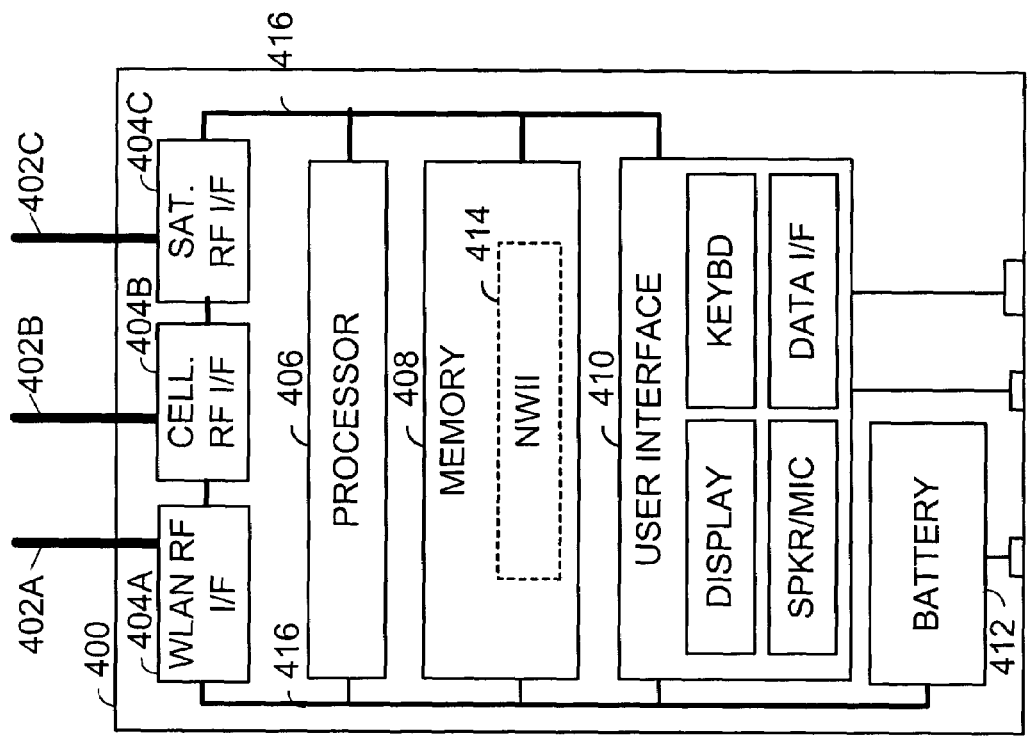

FIGS. 4A-4F provides block diagrams illustrating the typical components of various wireless terminals used according to this disclosure. FIG. 4A depicts wireless terminal 400 having only a short-range digital radio WLAN RF unit 404A that supports Bluetooth® or like wireless communications with the WLAN. FIG. 4B includes a cellular RF unit 404B that supports wireless communications with the cellular network. In this instance, the parallel path may be established internal to the wireless device. FIG. 4C includes a WLAN RF unit 404A and satellite RF unit 404C. FIG. 4D includes cellular RF unit 404B and satellite unit 404C. FIG. 4E includes WLAN RF unit 404A, cellular RF unit 404B, and satellite RF unit 404C. RF units, 404A, 404B and 404C couple to antennas 402A, 402B and 402C respectively. These antennas 402A, 402B, and 402C may be located internal or external to the case of the wireless terminal 400. Further, in some embodiments, a single RF unit and/or a single antenna may support communications with both the WLAN and the cellular network. Processor 406 may be an Application Specific Integrated Circuit (ASIC) or another type of processor capable of operating the wireless terminal 400 according to this disclosure. Memory 408 includes both static and dynamic components, e.g., DRAM, SRAM, ROM, EEPROM, etc. In some embodiments, the memory

408 may be partially or fully contained upon an ASIC that also includes the processor 406. A user interface 410 includes a display, indicators, a keyboard, a speaker, a microphone, and/or a data interface, and may include other user interface components known to those still in the art. RF interfaces 404A, 404B, and 404C, processor 406, memory 408, and user interface 410 couple via one or more communication buses/links 416. Battery 412 or power port 418 couples to and powers RF interfaces, processor, memory and the user interface.

Figure 4F:
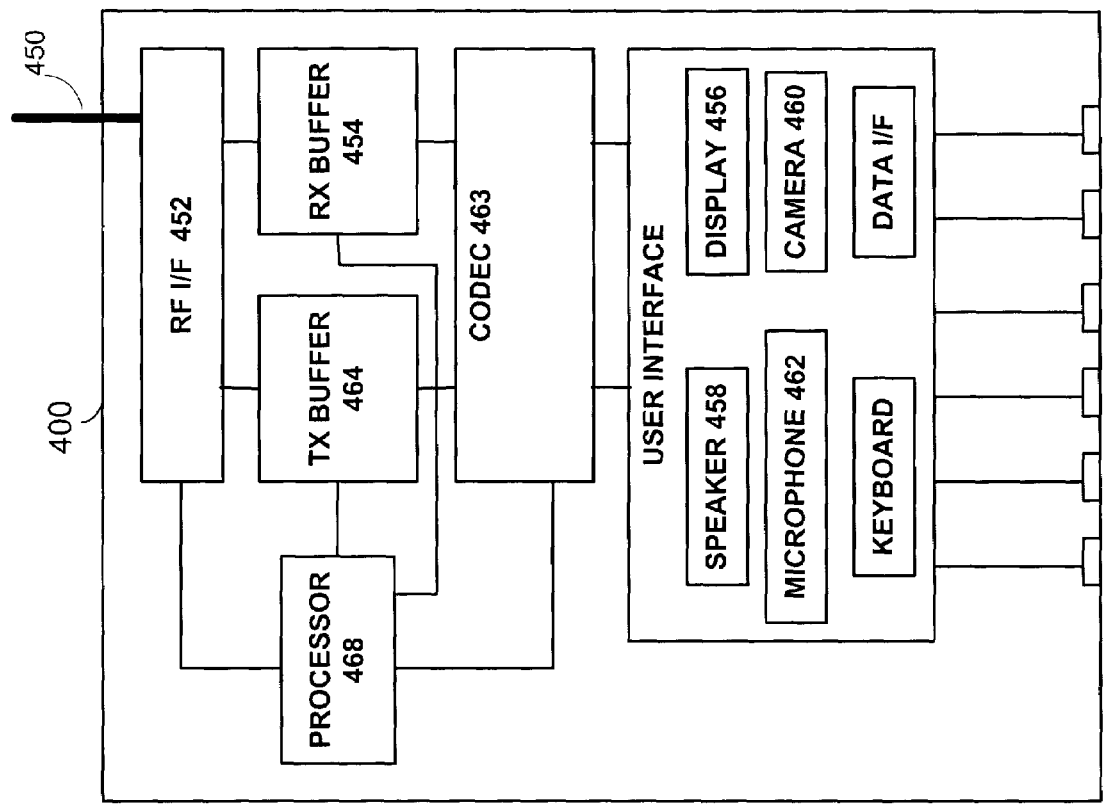

FIG. 4F provides a block diagram of a wireless terminal, which receives wireless communications through antenna 450. A wireless interface 452 allows the communications received through antenna 450 to be temporarily stored in a reception buffer 454 prior to being provided to a user, through a user interface, having a display and/or speaker. Similarly, camera 460 or microphone 462 may be used to take input from the user, which is coded, at CODEC 463 and provided to the transmission buffer 464. A microprocessor 468 may control the functions of the wireless interface with transmission buffer 464, reception buffer 454, and CODEC 463. Furthermore, the microprocessor may direct that the CODEC be adjusted, dependent on the traffic contained within the WLAN or any path between the transmitting wireless terminal and the communication's intended destination. By adjusting the CODEC, quality is adjusted up or down dependent on the available bandwidth contained within the weakest link in the communication pathway.

The embodiments of the wireless terminal 400 illustrated in FIGS. 4A-4F provide examples of wireless terminal configurations. Many other varied wireless terminal structures may be operated according to the teachings of the present invention.

Wireless terminal 400 may execute software instructions, i.e., Network Interface Instructions (NWII) 414. NWII 414 enables the wireless terminal 400 to establish parallel communications between various wireless networks and seamlessly switch the call's primary servicing network. NWII 414 load from memory 408 into processor 406 for execution. In other embodiments, these instructions may be based upon hardware function, firmware instructions, or a combination of any/all of these. Additionally, this functionality may be coordinated through an external processor.

Figure 5:
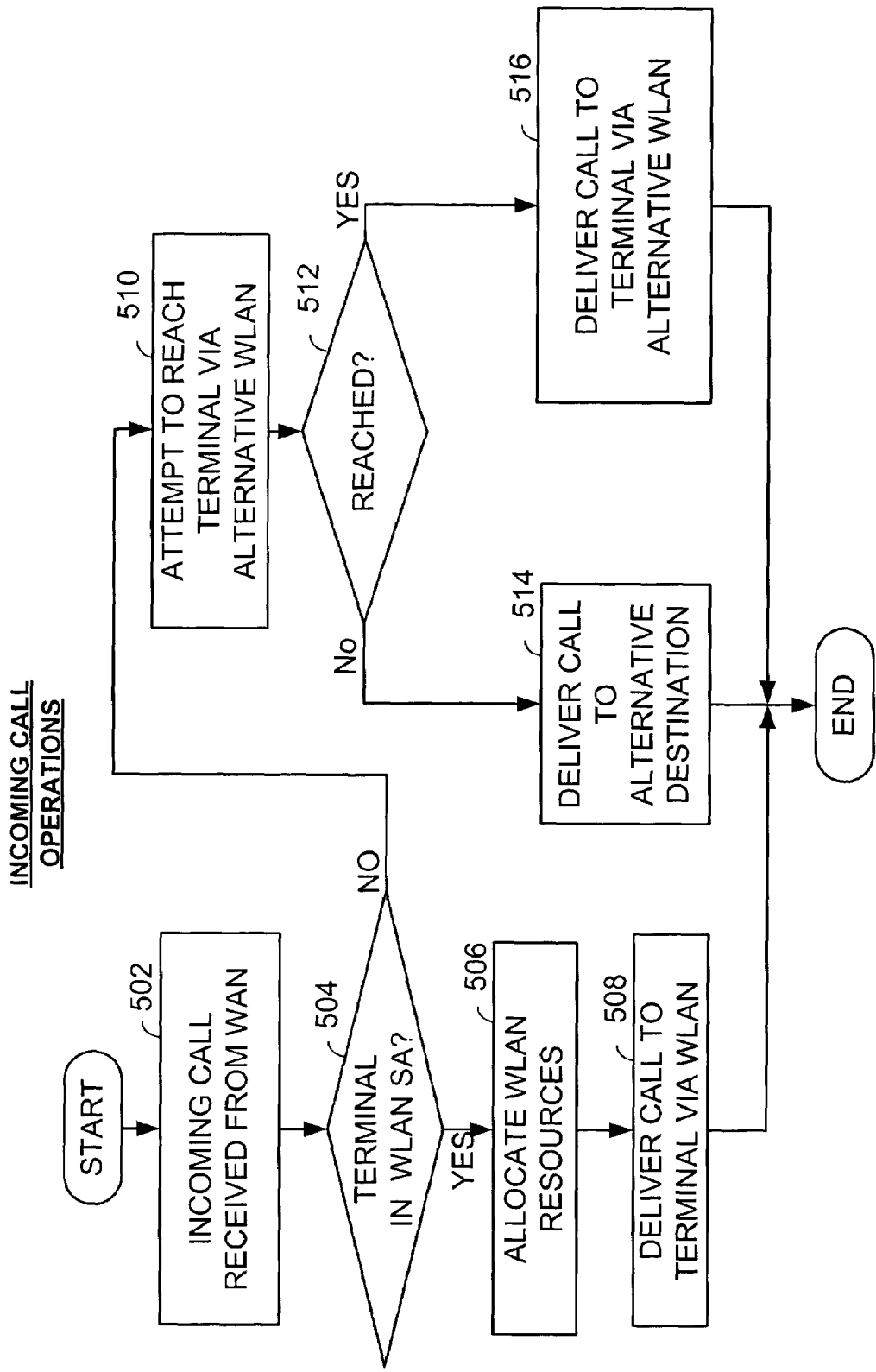
FIG. 5 provides a flow chart illustrating incoming call operations according to the present invention.

FIG. 5 provides a flow chart illustrating how an incoming voice communication may be handled. An incoming voice communication may be routed to a home WLAN after being received from the PSTN or other WAN at step 502. A determination is made as to whether the destination wireless device is currently being serviced by the WLAN at step 504. If so, WLAN resources are allocated to service of the incoming call in step 506. The call is then delivered to the wireless device via the WLAN at step 508.

When the wireless terminal is not serviced by the home WLAN, alternative WLANs may be queried to determine if the wireless device is registered with alternative WLANs. An attempt to route the call via an alternative network may be made at step 510. The communication pathway to those alternative WLANs may include cellular network, e.g., a GSM cellular network, satellite network(s) or other like network known to those skilled in the art. If communications are established with the wireless device at step 512, the communication is delivered to the wireless terminal.

If communications with the wireless terminal cannot be established (as determined at step 512), the call may be delivered to another destination such as voice mail or another operator at step 514.

Figure 6:
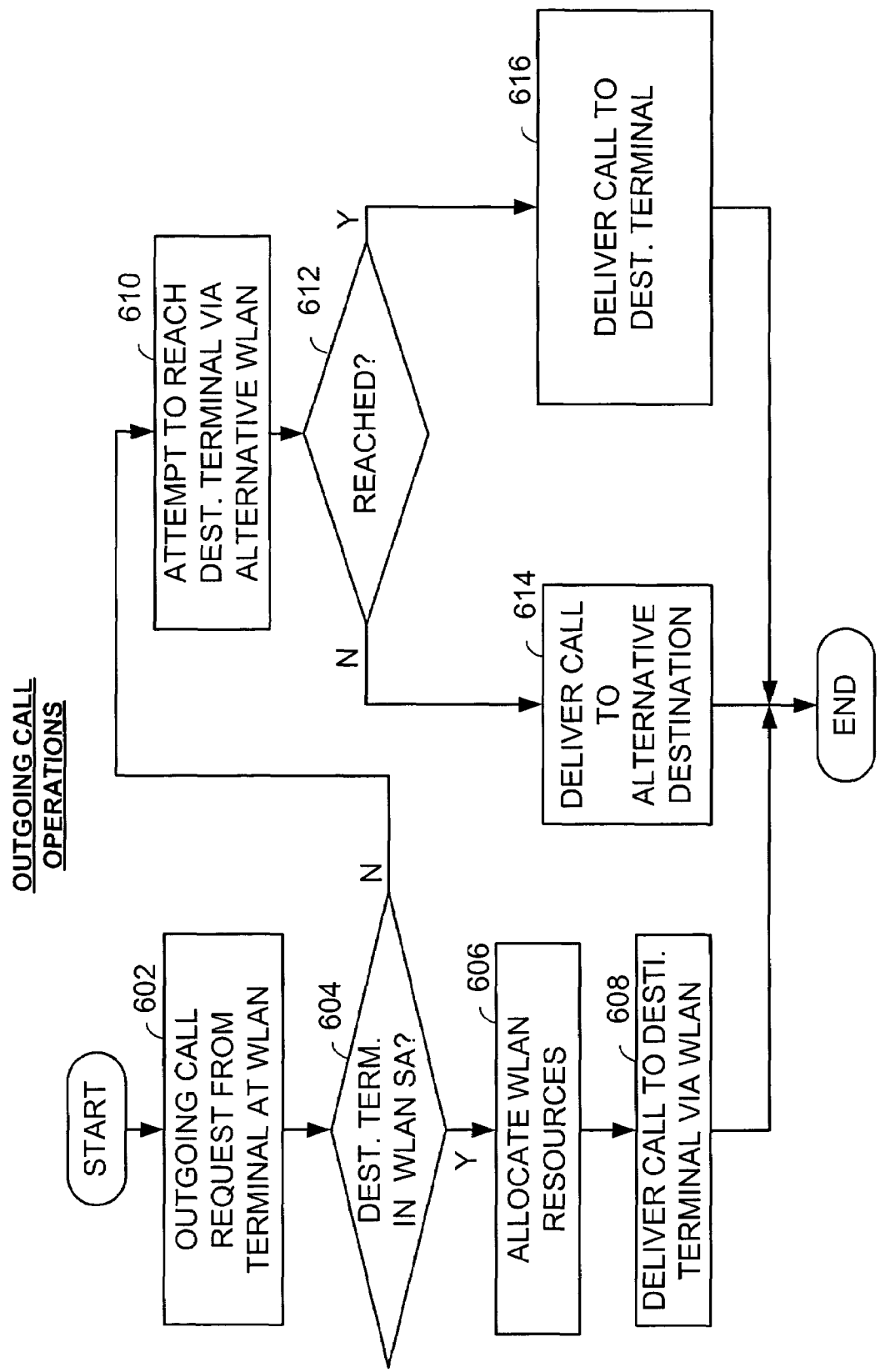
FIG. 6 is a flow chart illustrating outgoing call operations.

FIG. 6 provides a flow chart that depicts the servicing of an outgoing call. At step 602, the WLAN receives an outbound call request from the wireless device. A determination is made as to whether the destination wireless device is currently being serviced by the same WLAN at step 604. If so, WLAN resources are internally allocated to service the call at step 606. To allocate resources, the WLAN may delay some communications having lower priorities. The call is then delivered to the destination wireless device via the WLAN at step 608. When the outgoing call is not intended for a destination serviced by the WLAN, the call is outwardly routed via the WAN. This communication pathway may include the PSTN, a cellular network, satellite network, or the Internet, depending on which WAN the WLAN is coupled to.

When the destination is not currently being serviced by the WLAN, attempts are made to reach the destination wireless service via an alternative network such as cellular. If the wireless terminal can be reached (as determined at step 612), the call is delivered to the wireless terminal via the WAN at step 616. If the wireless terminal cannot be reached via the alternative network(s)(as determined at step 612), the call is delivered to another destination at step 614.

Figure 7:
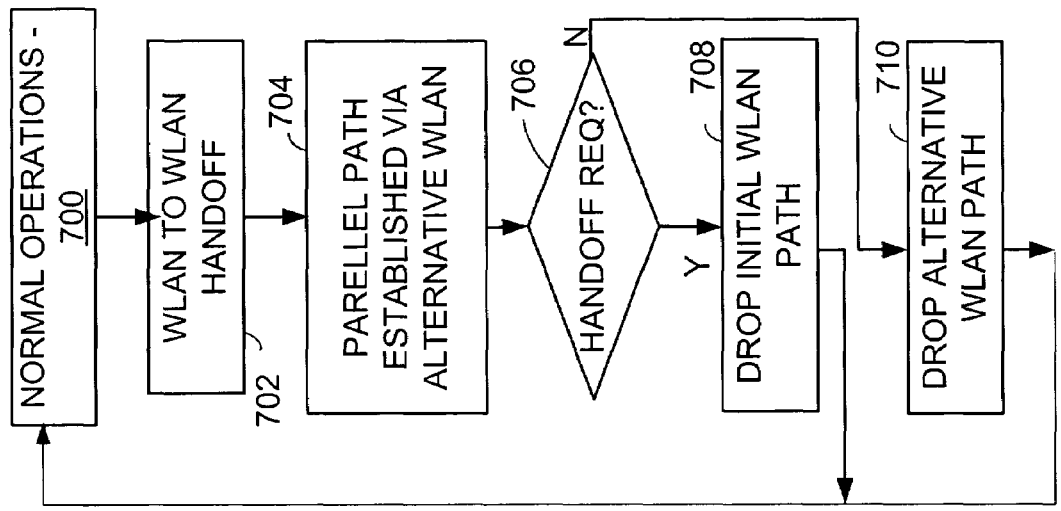
FIG. 7 provides a flow chart illustrating handoff operations according to the present invention.

FIG. 7 depicts one method by which communication services are handed off. Normal call servicing does not require a handoff (step 700). However, when a handoff may be required, the system determines the required type of handoff. When a WLAN to WLAN handoff is required, a parallel communication path is established and may involve an alternate network at step 704. Then, a determination is made as to whether the handoff is actually required by monitoring the communication quality another factor is between the wireless device and the WLAN at step 706. The communication quality may be measured by considering the received signal strength at a servicing AP, the wireless terminal, by measuring the bit error rate at either the AP or the wireless terminal, or other method known to those skilled in the art. The determination may also be based on the location of the wireless terminal relative to the boundaries of the various WLAN coverage areas. If handoff is required (as determined at step 706), one of the parallel paths is dropped and servicing continues via the remaining pathways. If handoff is not required (as determined at step 706 by comparing signal quality to predetermined threshold levels) due to an increase in the communication quality of the servicing WLAN, the new communication path is dropped at step 710. From each of steps 708 and 710, operation proceeds to step 700.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

What is claimed is:

1. A mobile network relay device operable to facilitate a wireless device handoff that includes existing wireless communications, wherein the handoff of the wireless device and existing communications occurs between an intra-vehicular wireless network and a first extravehicular wireless network, comprising:

a first wireless interface operable to communicate with a wireless device over the intra-vehicular wireless network, the wireless device operable to communicate through a second extravehicular wireless network;

a second wireless interface operable to communicate with the first extravehicular wireless network; and a vehicular mountable relay that communicatively couples the first wireless interface and the second wireless interface and that routes communications between the wireless device and the first extravehicular wireless network, wherein a coverage area of the intra-vehicular wireless network overlaps with a coverage area of the second extravehicular wireless network; and the vehicular mountable relay controls and services the wireless device handoff between the second extravehicular wireless network and the first extravehicular wireless network.

2. The mobile network relay device of claim 1, wherein:

the intra-vehicular wireless network is short-range digital radio network; and the first extravehicular network and the second extravehicular network are at least one cellular network.

3. The mobile network relay device of claim 2, wherein the short-range digital radio network is a Bluetooth® network.

4. The mobile network relay device of claim 1, wherein:

a coverage area of the intra-vehicular wireless network overlaps with a coverage area of a premises based wireless network; and the vehicular mountable relay controls and services handoff of the wireless communications between the premises based wireless network and the first extravehicular wireless network.

5. The mobile network relay device of claim 4, wherein during handoff parallel communication paths exist to service the wireless device, and wherein the parallel communication paths comprise:

a first communication path exists between the wireless device and the premises based wireless network; and a second communication path exists between the wireless device and the first extravehicular wireless network via the first wireless interface, the vehicular mountable relay, and the second wireless interface.

6. The mobile network relay device of claim 4, wherein the wireless device is a telephone hand set.

7. The mobile network relay device of claim 4, wherein the wireless device is a Personal Data Assistant.

8. The mobile network relay device of claim 4, wherein the vehicular mountable relay services handoff from a first extravehicular wireless network to a cellular network to a second extravehicular wireless network.

9. The mobile network relay device of claim 8, wherein the first extravehicular wireless network and the second extravehicular wireless networks have non-contiguous service coverage areas.

10. The mobile network relay device of claim 4, wherein the first extravehicular wireless network is a satellite based wireless communication network.

11. The mobile network relay device of claim 6, wherein the vehicular mountable relay determines capabilities of the telephone hand set.

12. The mobile network relay device of claim 11, wherein the vehicular mountable relay makes handoff decisions based upon the capabilities of the telephone hand set.

13. The mobile network relay device of claim 12, wherein the telephone hand set has Bluetooth®, 802.11, and/or cellular interfaces.

14. The mobile network relay device of claim 13, wherein:

a cellular connection through the telephone hand set's cellular interface has a first quality of signal;

a communication pathway through the extravehicular wireless network has a second quality of signal; and a processor directs that communications of the wireless device be serviced by the cellular connection or first extravehicular wireless network based on a comparison of the first quality of signal and the second quality of signal.

15. The mobile network relay device of claim 13, wherein a processor directs that communications of the wireless device be serviced by the Bluetooth®, 802.11, or cellular interfaces based on power consumption associated with the Bluetooth®, 802.11, and cellular interfaces.

16. The mobile network relay device of claim 5, wherein the vehicular mountable relay monitors a signal strength of the second extravehicular wireless network and initiates handoff to the first extravehicular wireless network when the signal strength compares unfavorably to a handoff threshold.

17. The mobile network relay device of claim 1, wherein the wireless device is registered with the first wireless interface.

18. A mobile network relay device mounted within a vehicle the mobile network relay device operable to facilitate a wireless device handoff that includes existing wireless communications, wherein the handoff of the wireless device and existing communications occurs between an intra-vehicular Wireless network and a first extravehicular wireless network, comprising:

a first wireless interface operable to communicate with a wireless device over an intra-vehicular wireless network, wherein the intra-vehicular wireless network is a short-range digital radio network, the wireless device operable to communicate through a second extravehicular wireless network;

a second wireless interface operable to establish an communication pathway with an first extravehicular wireless network, wherein the first extravehicular wireless network is a cellular network or a satellite based network; and a vehicular mountable relay that communicatively couples the first wireless interface and the second wireless interface and that routes communications between the wireless device and the first extravehicular wireless network wherein a coverage area of the intra-vehicular wireless network overlaps with a coverage area of the second extravehicular wireless network; and the vehicular mountable relay controls and services the wireless device handoff between the second extravehicular wireless network and the first extravehicular wireless network.

19. The mobile network relay device of claim 18, wherein the short-range digital radio network is a Bluetooth® network.

20. The mobile network relay device of claim 18, wherein:

a coverage area of the intra-vehicular wireless network overlaps with a coverage area of a second extravehicular wireless network; and the vehicular mountable relay controls and services handoff of the wireless device between the second extravehicular wireless network and the first extravehicular wireless network.

21. The mobile network relay device of claim 20, wherein during handoff parallel communication paths exist to service the wireless device, and wherein the parallel communication paths comprise:
- a first communication path exists between the wireless device and the second extravehicular wireless network; and
- a second communication path exists between the wireless device and the first extravehicular wireless network via the first wireless interface, the vehicular mountable relay, and the second wireless interface.

22. The mobile network relay device of claim 20, wherein the wireless device is a telephone hand set.

23. The mobile network relay device of claim 20, wherein the wireless device is a Personal Data Assistant.

24. The mobile network relay device of claim 20, wherein the vehicular mountable relay services handoff from a first second extravehicular wireless network to a cellular network to a second second extravehicular wireless network.

25. The mobile network relay device of claim 24, wherein the first second extravehicular wireless network and the second second extravehicular wireless networks have non-contiguous service coverage areas.

26. The mobile network relay device of claim 18, wherein the vehicular mountable relay determines capabilities of the telephone hand set.

27. The mobile network relay device of claim 26, wherein the vehicular mountable relay makes handoff decisions based upon the capabilities of the telephone hand set.

28. The mobile network relay device of claim 27, wherein the telephone hand set has Bluetooth®, 802.11, and/or cellular interfaces.

29. The mobile network relay device of claim 28, wherein:
- a cellular connection through the telephone handset's cellular interface has a first quality of signal;
- a communication pathway through the extravehicular wireless network has a second quality of signal; and
- a processor directs that communications of the wireless device be serviced by the cellular connection or first extravehicular wireless network based on a comparison of the first quality of signal and the second quality of signal.

30. The mobile network relay device of claim 28, wherein a processor directs that communications of the wireless device be serviced by the Bluetooth®, 802.11, or cellular interfaces based on power consumption associated with the Bluetooth®, 802.11, and cellular interfaces.

31. The mobile network relay device of claim 21, wherein the vehicular mountable relay monitors a signal strength of the second extravehicular wireless network and initiates handoff to the first extravehicular wireless network when the signal strength compares unfavorably to a handoff threshold.

32. The mobile network relay device of claim 18, wherein the wireless device is registered with the first wireless interface.

* * * * *